Nov. 21, 1950 V. F. DAVIS 2,530,652
SNAP-ACTION CONTROL MECHANISM
Filed Jan. 31, 1948 3 Sheets-Sheet 1

INVENTOR
VERNER F. DAVIS,
BY
Harry B. Rook,
ATTORNEY

Nov. 21, 1950  V. F. DAVIS  2,530,652
SNAP-ACTION CONTROL MECHANISM
Filed Jan. 31, 1948  3 Sheets-Sheet 3

INVENTOR
VERNER F. DAVIS,
BY
Harry N. Cook,
ATTORNEY

Patented Nov. 21, 1950

2,530,652

UNITED STATES PATENT OFFICE 2,530,652

SNAP-ACTION CONTROL MECHANISM

Verner F. Davis, West Orange, N. J., assignor to Atlas Valve Company, Newark, N. J., a corporation of New Jersey Application January 31, 1948, Serial No. 5,671

1 Claim. (Cl. 74—110)

This invention relates in general to a valve of the type wherein a valve element is moved from one position to another position with a snap-action under certain conditions of operation; and more particularly, the invention contemplates such valves in which the valve element is operated by a pressure-responsive diaphragm or piston in one direction to open an inlet port and close a discharge port and in the opposite direction to close said inlet port and open said discharge port.

Prime objects of the invention are to provide a valve of this character which shall embody novel and improved features of construction wherein a valve element can be moved a substantial distance between the inlet and discharge ports by a relatively small or minute movement of a device for controlling the actuation of said valve element; and to provide novel and improved means whereby such minute movement of the control elements shall effect a travel of substantial distance of said valve element with a snap-action.

Another object is to provide a self-contained pressure operated valve of the type hereinbefore described which shall include a novel and improved construction and combination of parts including frictionless knife-edge bearings, whereby smooth and accurate snap-action operation, free from frictional resistance, shall be ensured and the necessity for stuffing boxes and friction bearings shall be obviated.

Valves of this character are useful for many purposes but are of especial importance in oil refining equipment where they constitute a part of an elaborate safety appliance system. In the oil refining industry, valves having stuffing boxes and friction bearings are undesirable because of the corrosive action of the vapors in the ambient atmosphere, it being essential that the valves open and close with a positive snap-action in order that the equipment under their control may be shut down in an emergency as quickly as possible. Such equipment is operated by air pressure in accordance with a prearranged program and the control valves are arranged in series. Consequently, it is important that there be no lag through any of the control valves in the supply of air to any one piece of equipment, which makes clear the necessity of accurate snap-action operation of the valves.

For the purpose of illustrating the principles of the invention, I have shown one form of pressure operated control valve in the accompanying drawings, in which Figure 1 is a side elevational view of the valve;

Figure 1:
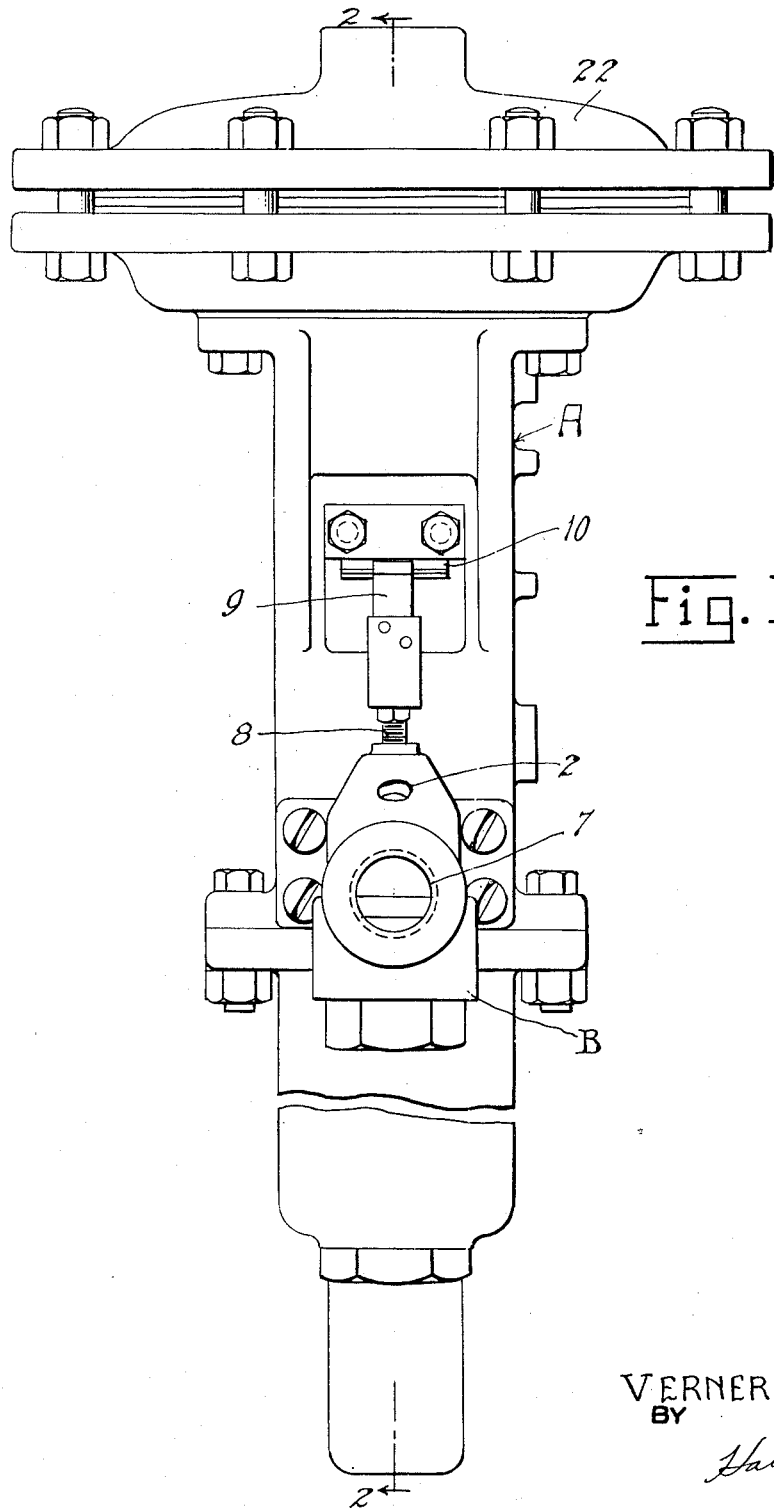
Figure 2:
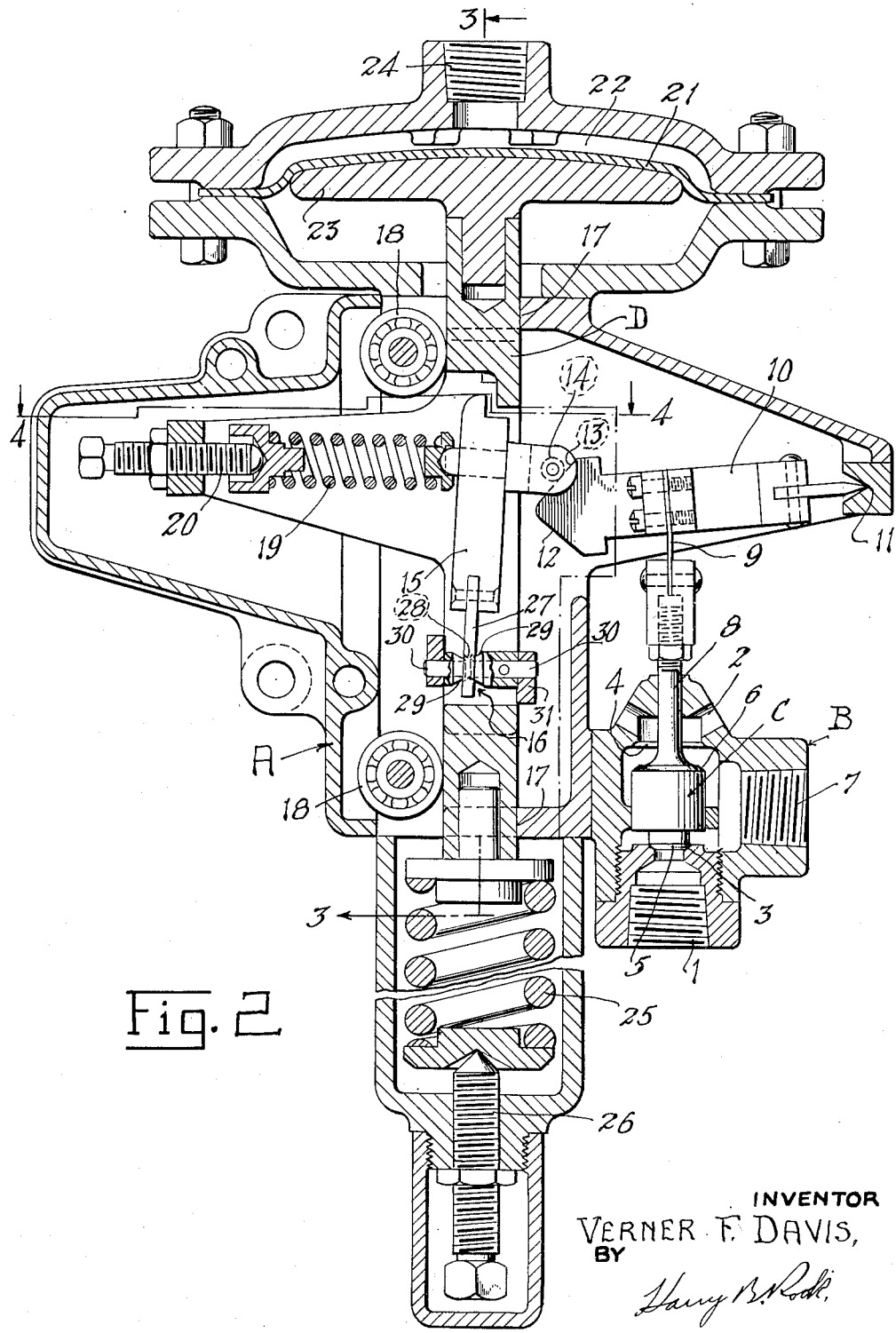
Figure 2 is a vertical longitudinal sectional view, approximately on the plane of the line 2—2 of Figure 1.
Figure 3:
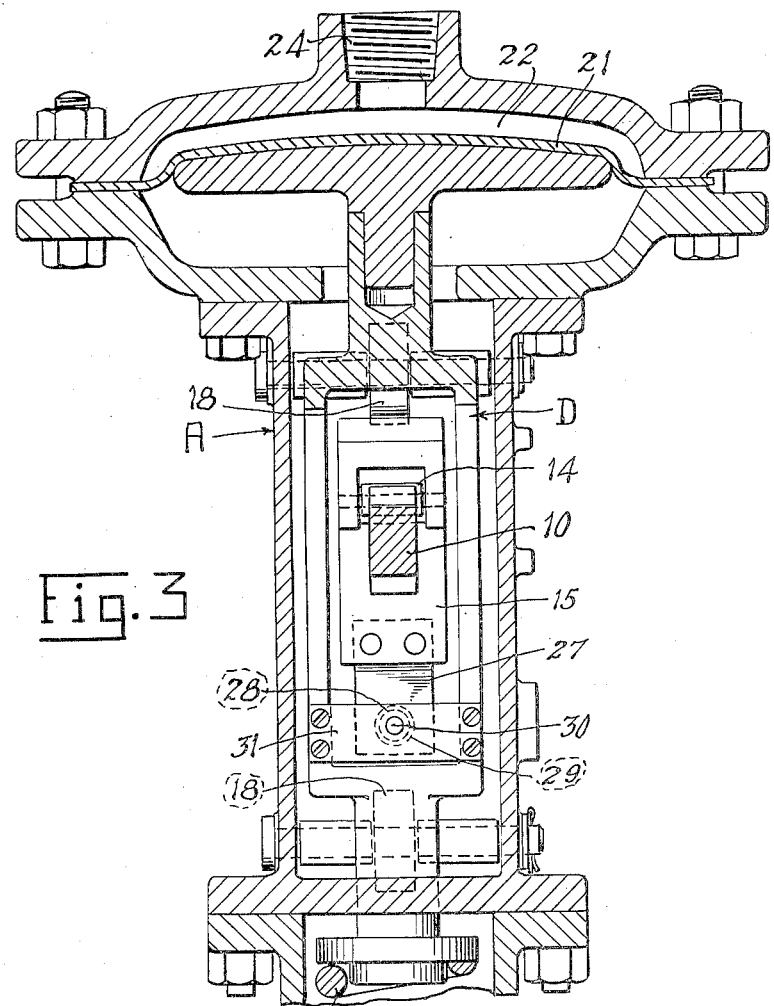
Figure 3 is a transverse vertical sectional view, approximately on the plane of the line 3—3 of Figure 2.
Figure 4:
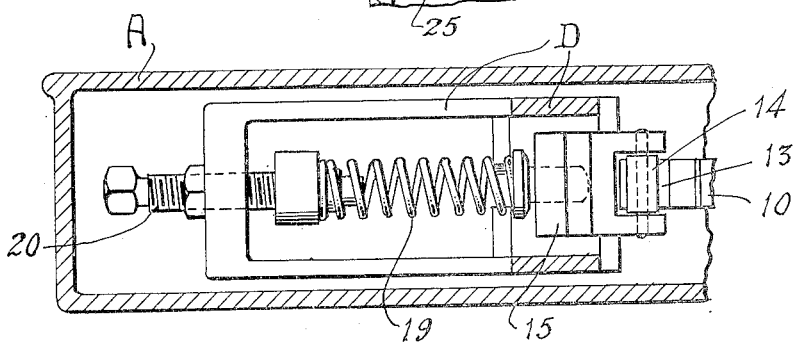
Figure 4 is a fragmentary horizontal sectional view, approximately on the plane of the line 4—4 of Figure 2.

Specifically describing the invention, the valve includes a main casing A for the actuating and control mechanism and an auxiliary casing B for the control valve element C. This auxiliary casing has an inlet port 1 for fluid under pressure and exhaust ports 2 that have the respective valve seats 3 and 4 to cooperate with the respective valve heads 5 and 6 on the element C, so that when said element is in one position, as shown in Figure 2, the inlet port is closed and the outlet port is open to discharge fluid under pressure through a port 7 from the apparatus or devices to be controlled, while when the element C is in the opposite position, the exhaust port is closed and fluid under pressure is permitted to flow from the inlet port 1 through the port 7 to the devices to be controlled.

In accordance with the invention, the valve element C is reciprocated in opposite directions to simultaneously open one port 1 or 2 and close the other port, with a snap-action and with relatively minute movement of a control device for the actuating means. As shown, the valve stem 8 is connected by a resilient strip 9, preferably of spring steel, to a valve reciprocating lever 10 one end of which is fulcrumed on a knife-edged bearing 11 in the main casing A, while its other end has two oppositely inclined surfaces 12 and 13 that meet on the longitudinal median plane of the lever 10 which cooperate with a roller 14 on an actuating or trip lever 15 which is mounted at one end on a knife-edge bearing 16 within a transverse opening in a yoke D that constitutes a control device which is longitudinally reciprocable in the casing A between bearing surfaces 17 and rollers 18, so that said devices may move longitudinally in the same direction as the valve reciprocating lever 10. The other end of the lever 15 is constantly actuated by a compression spring 19 to force and hold the roller 14 in contact with one or the other of the inclined surfaces 12 and 13 of the lever 10, the compression of said spring being adjustable by an abutment screw 20 mounted in the yoke D at the side of said trip lever opposite the operating lever 10.

As shown, this control device B is responsive to variable fluid pressure by means of a flexible diaphragm 21 disposed in a diaphragm chamber 22 and bearing upon a platen 23 at one end of the control device, the variable fluid pressure being admitted to the diaphragm chamber through a port 24. The effect of the variable fluid pressure on the control device is regulated by a compression spring 25 interposed between the other end of the control device and an adjusting screw 26. By adjusting this screw 26, the pressure in the diaphragm chamber 22 at which it is desired to actuate the valve element C may be predetermined.

In operation, and assuming that the fluid pressure on the diaphragm 21 exceeds the force of the spring 25 plus the force required to compress the spring 19, the yoke or control device D is forced downwardly and carries with it the trip or actuating lever 15 so as to cause the roller 14 to ride over the inclined surface 13 of the lever 10, during which action compression of the spring 19 is continued so as to increase the force on the valve element C holding the inlet port 1 closed. When the yoke D has moved a sufficient distance to bring the axis of the roller 14 below the meeting point of the surfaces 13 and 12 at the longitudinal median plane of the lever 10, the force of the spring 19 will rock the trip lever 15 to cause the roller 14 to ride along the inclined surface 12 of the lever 10 and thereby lift said lever with a snap-action and actuate the valve element C to open the inlet port 1 and close the discharge ports 2.

When the variable pressure in the diaphragm chamber 22 exerts a force on the yoke D less than the force of the control spring 25 and the force of the actuating spring 19, the yoke D moves upwardly so as to cause the roller 14 to ride along the inclined surface 12, thus compressing the actuating spring 19 and causing the valve element to more tightly close the exhaust ports 2, until the axis of the roller 14 has moved above the meeting point of the inclined surfaces 12 and 13, whereupon the trip lever 15 will be actuated by the spring 19 to swing the lever 10 downwardly with a snap-action and actuate the valve element C to close the inlet port 1 and open the exhaust port 2, as shown in Figure 2. The force exerted by the spring 19 on the lever 10 may be adjusted by the abutment screw 20 so as to vary the speed at which the operating lever 10 is actuated.

Any suitable knife-edge bearings may be utilized, but the preferred form for mounting the lever 15 comprises a fulcrum plate 27 having a transverse opening 28 that tapers inwardly from opposite sides of the plate, and a conical bearing sleeve 29 seated in said opening from each of opposite sides of the plate and mounted on a pin 30 secured in a cross-bar 31 on the yoke.

It will thus be seen that my invention provides a pressure operated control valve wherein the valve element is actuated a substantial distance in opposite directions with a positive snap-action and with a relatively minute movement of the control device. This snap-action is facilitated by the knife-edge bearings 11 and 16 which are substantially frictionless and are corrosion-resistant so as to avoid the possibility of impairment of the operation of the valve by corrosive ambient atmospheres.

While I have shown and described the invention as embodied in certain details of construction, it should be understood that this is primarily for the purpose of illustrating the now preferred form of the control valve and that many modifications and changes can be made in the details of construction of the valve within the spirit and scope of the invention.

Having thus described the invention, what I claim is:

A snap-acting control mechanism including a casing, a control device comprising a yoke having a transverse opening therethrough intermediate its ends, guide means adjacent the ends of said yoke for reciprocably mounting the yoke in said casing, an element to be controlled disposed at one side of said yoke and movable alternately in opposite directions, an operating lever at said side of said yoke and fulcrumed to swing in the directions of reciprocation of said yoke, a connection between said operating lever and said element to actuate said element upon swinging of said lever, a trip member mounted on said yoke within said transverse opening to move in directions transverse to the direction of movement of said yoke, said operating lever having two oppositely inclined meeting surfaces and said trip member having a part to contact and move along said surfaces, an abutment on said yoke at the side thereof opposite said operating lever, and a spring interposed between said abutment and said trip member and normally pressing said part of said trip member into yielding contact with one or the other of said surfaces, whereby upon movement of said yoke a predetermined distance in either of opposite directions said portion of said trip member moves successively along one of said inclined surfaces to the meeting point of said surfaces and then into contact with the other said surface whereupon said trip member is actuated by said spring to swing said operating lever in one direction, said element being guided in its movement, said operating lever being fulcrumed at one end on a knife-edge bearing and having said inclined surfaces at its other end, said connection between said operating lever and said element being a strip of spring material, and said element and said trip member being associated with said operating lever so as to hold the lever against displacement from said knife-edge fulcrum bearing.

VERNER F. DAVIS.

REFERENCES CITED

The following references are of record in the file of this patent:

UNITED STATES PATENTS

| Number | Name | Date |
| --- | --- | --- |
| 657,677 | Roesch | Sept. 11, 1900 |
| 1,764,193 | Bavehl | June 17, 1930 |
| 1,842,332 | Le Pas | Jan. 19, 1932 |
| 2,051,049 | Landberg | Aug. 18, 1936 |
| 2,321,423 | Rogers | June 8, 1943 |